Figure 1:
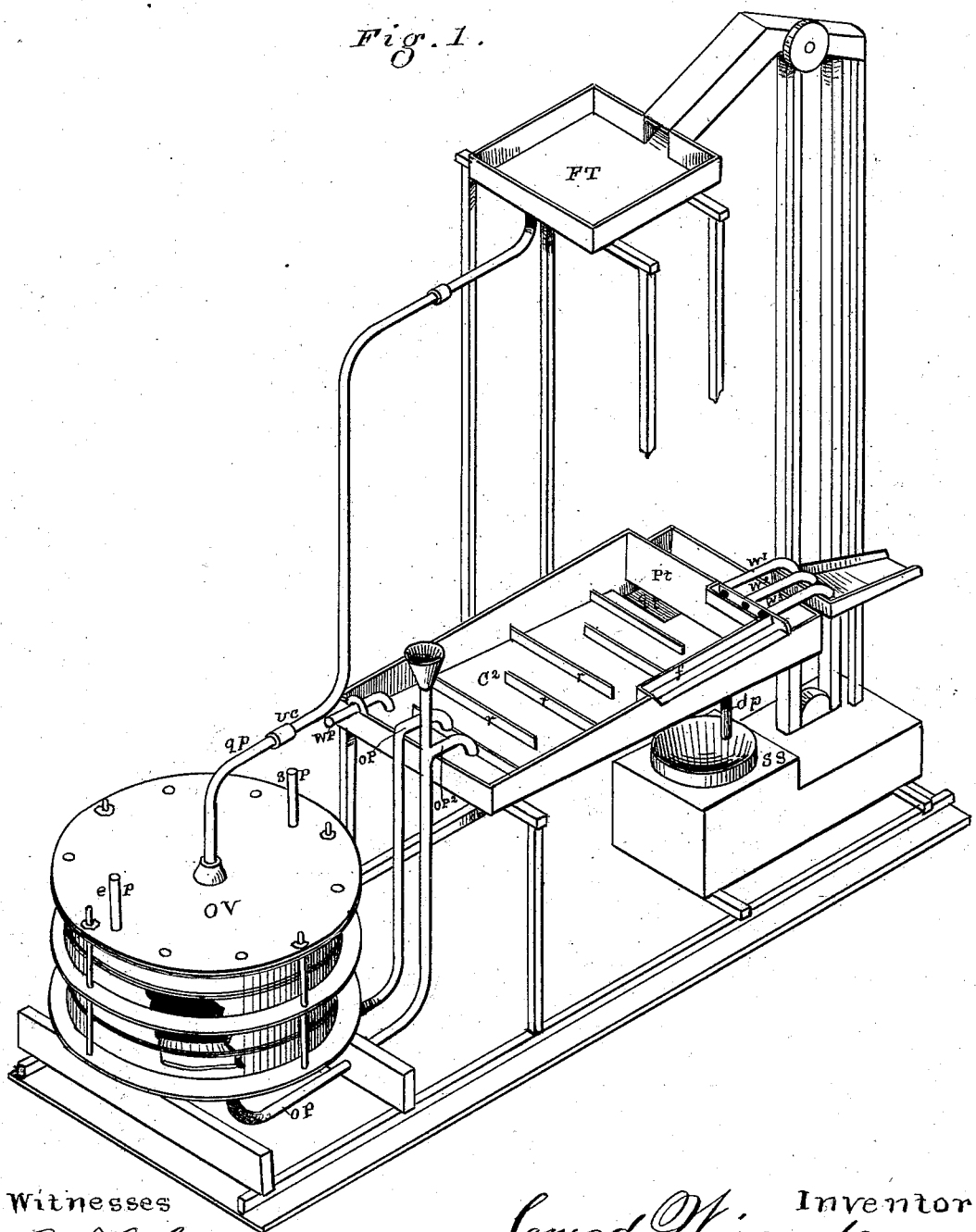

C. WIEGAND.
Leaching Out Silver from Mixed Amalgams by Mercury.
No. 219,132. Patented Sept. 2, 1879.

Witnesses
Geo. H. Strong
Frank A. Brooks

Inventor
Conrad Wiegand
by Dewey & Co.
Attys.

2 Sheets—Sheet 2.
C. WIEGAND.
Leaching Out Silver from Mixed Amalgams by Mercury.
No. 219,132.  Patented Sept. 2, 1879.
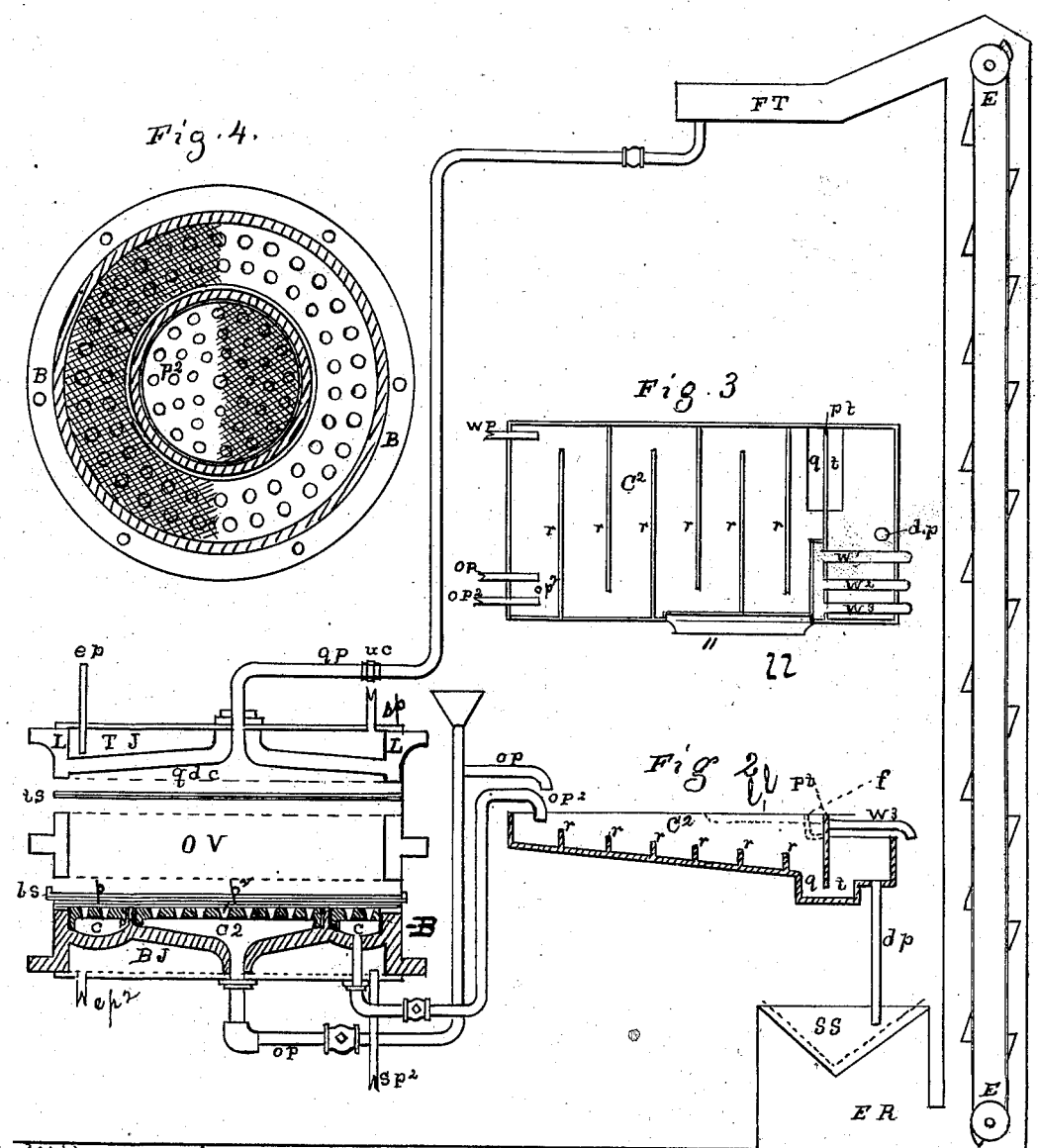
Witnesses
Geo. H. Strong.
Frank A. Brooks.
Inventor
Conrad Wiegand
by Dewey & Co.
Attys.

UNITED STATES PATENT OFFICE.

CONRAD WIEGAND, OF VIRGINIA CITY, NEVADA.

IMPROVEMENT IN LEACHING OUT SILVER FROM MIXED AMALGAMS BY MERCURY.

Specification forming part of Letters Patent No. 219,132, dated September 2, 1879; application filed May 9, 1879.

*To all whom it may concern:*

Be it known that I, CONRAD WIEGAND, of Virginia City, Storey county, Nevada, have simplified the method heretofore described for operating a certain process for refining silver, for which Patent No. 145,265 was issued to me, and which was more fully described in Patent No. 168,695; and I have invented apparatus specially adapted to operating the process in the simplified way, a description of which hereinafter is given, and is sufficient to enable others to understand the same.

The process as heretofore described embraced, first, the hot-leaching of silver amalgam away from the amalgam of other metals, using mercury as the leaching solvent; next, the cooling of the filtrate; next, the collection of silver amalgam therefrom, and, finally, the return of the cold-strained quicksilver to the heating or operating vessel.

In working the process as heretofore described, it was recommended to dilute the comminuted amalgams with quicksilver before leaching them and to maintain agitation.

The simplification herein referred to consists in avoiding the mercurial dilution of the amalgam out of which the silver is to be leached, whereby a comparatively small amount of quicksilver will suffice for operation, and at the same time mechanical appliances for agitation may be dispensed with.

The speedy filtration aimed at by mercurial dilution and agitation in a vertically-elongated vessel may be more fully attained by the new method herein described, simply by increasing the temperature of the quicksilver as it is fed into the operating-vessel; or, when conveniences for safe high heating are not readily attainable, speed can be reached by raising the height of the quicksilver-feeding pipe, which may be aided by increasing the diameter of the operating-vessel, (and adapting its depth or height to hold the desired charge,) so as to secure for it a larger superficial straining-surface. Height of quicksilver-feeding pipe as indicated, however, is herein shown only as one mode of obtaining pressure, and as one possessing the advantage of furnishing a continuous forcing feed. Any other method of forcing quicksilver through the amalgam, whether by a continuous or by an intermitted feed or pressure, and in any direction whatever, would be the operative equivalent of the method of operation herein described.

Figure 1 represents a perspective view of my improved apparatus; Fig. 2, a vertical section of the same. Fig. 3 is a plan view of the cooler. Fig. 4 is a plan view of the bottom of the operating-vessel.

In the drawings herewith, designed to represent the essentials of the new form of apparatus, and by means thereof to make clear the improvements in method of operation, O V represent the operating-vessel. B is its bottom. L is its lid.

Although not necessarily so, the bottom B is represented as removable from O V, because pinching the bottom straining-cloth $b\ s$ between a removable bottom and the body of the operating-vessel offers a ready method of securing the straining-cloth in place in such a way that the leaching quicksilver must infallibly pass through the cloth. If, however, the bottom is cast as a fixed part of O V, the bottom straining-cloth can be fastened to a removable close-fitting metallic ring similar to that shown in the drawings, upon which $b\ s$ is stretched, which may be made small enough to drop into O V before adjusting the lid L.

L, the lid, is represented as removable, for convenience in charging and discharging amalgam into and from the operating-vessel, and as containing a recess or cavity on its under side, which, in combination with the top strainer, $t\ s$, supported, as shown, to close the mouth of the cavity, forms a quicksilver-diffusing chamber, as hereinafter more fully shown.

Constructed as shown in the diagram, when in operation both the lid L and the bottom B are to be bolted to O V in such a way as firmly to hold the top and bottom strainers, $t\ s$ and $b\ s$, between them and O V, at the points shown by the dotted lines in O V.

The lid is also represented as furnished with a steam-chamber or top jacket, T J; but this is necessary only when the facilities for heating quicksilver to a high temperature before rapidly feeding it into O V are not readily obtainable.

The bottom B is also represented as furnished with a steam-heating chamber, B J, designed to keep it so hot as to prevent the deposition of amalgam within the iron bottom B below the straining-cloth $b\,s$, which deposition is liable to occur on surfaces having a lower temperature than that of the filtering mercury; but any other contrivance for applying a regulatable heat at this point would answer this purpose. Indeed, provided the iron bottom and its fixtures be made light and its inner surfaces smooth, a rapid filtration of hot mercury through the vessel O V will prevent the deposition of amalgam without any external application of heat.

A quicksilver-diffusing chamber, $q\,d\,c$, is represented as formed in the lid L by bolting a straining-cloth, $t\,s$, supported by a perforated flat plate, between the lid L and O V. Of course, a lid straight on its under side, against which the top straining-cloth should be pressed and supported by a perforated plate having a recess or concavity on its upper side, would form an equivalent quicksilver-diffusing chamber whether the cloth be loosely laid on or fastened to the supporting-plate, or whether that plate should extend for support to the outside of O V, as shown, or be supported by some suitable fixture within the operating-vessel.

The design of this diffusion-chamber is to cause a uniformly-diffused feed of quicksilver from the quicksilver-pipe $q\,p$ to enter the amalgam in O V. The small apertures of the cloth obstruct the rapid passage of quicksilver at any single point, which results in a uniformly-diffused pressure of quicksilver throughout the inclosing-cavity, whereby it presses nearly equally through every aperture of the cloth.

A union-coupling on $q\,p$ is lettered $u\,c$. Its use is evident from its name and position in the drawings.

The bottom strainer or straining-cloth, $b\,s$, is represented in the drawings as stretched upon and fastened to a rigid metallic ring which extends to the outside of O V. Its use is to keep the strainer taut; but when the bottom B is made to be removable from O V this ring is not a necessity. The straining-cloth may then be laid loosely on top of the fixtures appertaining to the bottom B, as described, and stretched, after slightly tightening a few of the bolts which hold the bottom to place. When the bottom is not made removable the cloth may be stretched upon and attached to such a ring made small enough to drop within O V, in which case the supports of the strainer can be raised or lowered to adapt O V to receive either a large or small charge of amalgam.

In the drawings, B is represented as divided into two circular compartments or cavities, $c$ and $c^2$. Into these cavities circular plates are set, in which large holes are formed. These plates are lettered as $p$ and $p^2$. On top of them flat wire-cloth mats are laid and preferably fastened. The wire of which the mats are formed is coarse. The meshes of the mat, however, are small. These mat-topped plates are designed to support the cloth without obstructing its pores as a flat surface will. The irregular surface of the wire mat maintains open channels from the under side of the cloth to the large perforations in the plates.

Fig. 4 is a top view of the bottom B, showing the plates $p\,p^2$ in place, and with one-half of each divested of the described iron mat.

The intent of compartmenting the bottom B is to enable the operator to control the direction of the leaching flow of quicksilver through various parts of O V when filled with amalgam. For this reason each compartment is furnished with an outflow-pipe, $o\,p$ and $o\,p^2$, and each of these pipes is furnished with a stop-cock, by means of which the outflow from O V immediately above or over its own compartment may be either arrested or regulated quantitatively.

Though only two such compartments are shown, the greater the number of compartments the more perfect will be the directing control of currents secured. But there is no necessity for compartments in the bottom, as just described, when there are good facilities for rapidly heating quicksilver to a temperature approximating 300° Fahrenheit. In that case the amalgam seems to interpose no appreciable mechanical resistance to the passage of quicksilver through its mass. At moderate temperatures it does, and the quicksilver doubtless moves at points within the body of amalgam presenting to it the least resistance. When, therefore, the boiler-pressure, and consequent sensible temperature of steam, is low, a directive as well as quantitative control of the currents of quicksilver within O V is desirable, and the foregoing method of securing it is therefore indicated. It can be rendered even more perfect by sinking thin iron rings into and through the body of the amalgam after O V is charged therewith, which rings should be of the same size and shape as the partitions in the bottom which form the compartments there, so that in effect O V will be compartmented to coincide with the compartments of the bottom. In this case a circle of iron screen should be laid above the bottom strainer, $b\,s$, to prevent the edges of the rings from cutting the cloth.

Without compartmenting the bottom such a compartmenting of O V will answer, though less perfectly, the same end, for it will lack only a quantitative control of the quicksilver in its flow through the amalgam.

The outflow-pipes $o\,p$ and $o\,p^2$ are drawn with an upturn, as a simple and effective means of keeping the leaching quicksilver "backed up" to the bottom strainer, $b\,s$, whereby the cavities $c$ and $c^2$ in B are kept filled with a metal, (quicksilver,) which is also a fluid, and the heat imparted by B J is thereby rapidly conducted to the bottom strainer, $b\,s$, and through it in a measure to the amalgam in O V, at the same time preventing the deposition of amalgam upon the plates in the cavities $c$ and $c^2$. But when the facilities for a preliminary high heating of quicksilver are good no such uprise in the outflow-pipes is necessary, and the cooler may then advantageously be set so low that the outflow-pipes will discharge into it without any uprise.

Heat is represented as imparted to T J and B J by the steam-pipes $s\,p$ and $s\,p^2$, a circulation being secured by means of the exhaust-pipes $e\,p$ and $e\,p^2$.

At the highest point of $o\,p$ a funnel, $fl$, is represented, the use of which is to fill the cavities in B before charging O V with amalgam. Quicksilver poured in at $fl$ will first fill $c^2$ and then overflow into $c$. If this be not attended to, air would remain in the cavities $c$ and $c^2$ and impair the intended action of the bottom heating-chamber, B J, as well as occasion a fitful spouting of quicksilver from the outflow-pipes.

C represents a sectional side view of the cooler. In Fig. 2, $C^2$ shows a top view of the same. It is simply a tank, preferably of iron, with an inclined bottom, the upper side of which is furnished with low ribs $r$, projecting alternately from the opposite sides of the tank. The lower end of C is also provided with a quicksilver-trap, $q\,t$, designed to allow a free flow through it of quicksilver, but to prevent the passage of water, as is fully described in Patent No. 196,848. This tank is herein represented as simplified, because without any water-jacket on its under side, as heretofore described.

The inflow of quicksilver to the cooler is from the outflow-pipes $o\,p$ and $o\,p^2$ from O V. Cold water enters the cooler by the water-pipe $w\,p$, and overflows or runs to waste either at the broad lip $l\,l$ or through the waste-pipes $w^1$, $w^2$, and $w^3$.

This cooler is represented with an improvement upon that referred to in Patent No. 196,848. The improvement is designed to prevent quicksilver from floating off with the water at the overflow or waste pipes, for small particles of quicksilver, when that metal is discharged rapidly and hot into cold water, will ride and float upon the surface of the water. If the water is confined at its surface in time they will form into web-like clusters, which, as if electrically repelling each other, as well as the water on top of which they float, depress it like a boat. This depression seems to force some of the component particles of the cluster to unite. In water quiescent, or nearly so, they then sink, and, touching the moving quicksilver at the bottom of the cooler, they coalesce with it and are saved; but if the water in the cooler is not confined at the surface, the isolate floating particles pass off with the waste water and are lost.

To prevent that loss, a fender, $f\,f\,f$, is placed around the overflow or waste pipes. A second one, parallel to and in front of it, would be better than a single fender; but for the sake of simplicity a single fender is alone represented in the drawings. It is set so that its top edge is above the surface of the water, while its lower edge is a little below the water-surface; but the immersion of the lower edge must be only a very little below the surface; otherwise the water, as it is heated by the hot quicksilver flowing over the bottom of the cooling-tank, will rise to the surface and be confined in the cooler.

The foregoing-described fender, by its described adjustment, without checking the flow of warm water beneath the fender toward the proper point for its discharge, will keep back the particles of floating quicksilver on the surface of the water until, by protracted proximity, they aggregate to globules large enough to sink out of the clusters which they at first form into, and the speed of the water-current at any single point of the fender is not great enough to carry these sinking globules with it to waste. They therefore sink through the diffused current to the quicksilver at the bottom of the cooler and are saved.

The material of which the fender should be constructed is not important. Iron is good. Amalgamated copper is better if kept bright; but a stretched cloth answers very well, as a piece of floating wood confined to its true position will also. In the drawings it is represented as part of the cooling-tank.

The discharge-pipe for cooled quicksilver is lettered $d\,p$. The trap is formed by the partition $p\,t$ entering the cavity $q\,t$. The dense quicksilver buoys the water away from the bottom of the partition, which prevents it from passing through the trap.

S S represent a canvas straining-sack, fastened to a rigid ring resting on top of the elevator-reservoir E R. Into this sack the pipe $d\,p$ discharges the cooled quicksilver, bearing within it refined silver amalgam. The silver is retained in the sack; but the quicksilver strains through the cloth and passes into the elevator-reservoir E R, whence it is carried by the elevator E E to the feeding-tank F T.

Having shown the simplification of method for operating the process hereinbefore recited, as also the apparatus adapted thereto, and their advantages, I desire to secure by Letters Patent the following:

1. In the process of separating or refining silver through a more or less complete separation of its amalgam from the amalgams of other metals by mercurial leaching, the mode of separating the silver amalgam, which consists in forcing the leaching quicksilver hot through the undiluted amalgams, substantially as hereinbefore set forth.

2. The quicksilver-diffusing chamber $q\,d\,c$, having the diaphragm $t\,s$, of cloth or other woven or porous material, suitably supported, as shown, whereby a moderate resistance to the flow of the quicksilver at every point is interposed and a consequent equable flow of the same through every part of the diaphragm is insured to the upper surface of the amalgam undergoing the leaching process, substantially as and for the purpose hereinbefore set forth.

3. The lower or bottom strainer, in combination with the supporting iron bottom divided into compartments, each having its own outlet controlled by a stop-cock, substantially as hereinbefore described.

4. The upturned outflow-pipes $o\,p$ and $o\,p^2$, having their outlets above the level of the bottom strainer, $b\,s$, in combination with the heating-chamber B J and the bottom strainer, $b\,s$, and its supports, whereby the quicksilver is kept backed up against the bottom strainer, $b\,s$, for heating purposes, substantially as hereinbefore set forth.

5. A leaching and straining box or digester consisting, essentially, of the vessel O V, furnished with a bottom strainer for straining quicksilver as it filters hot through the amalgam contained in the vessel, in combination with a removable lid furnished with a strainer, supported as described, to form a quicksilver-diffusing chamber, substantially as and for the purposes hereinbefore set forth.

In witness whereof I have hereunto affixed my signature.

CONRAD WIEGAND.

Witnesses:
FRANCIS E. MILLS,
SAMUEL DOWLING.